(12) United States Patent
Choi et al.

(10) Patent No.: US 12,054,609 B2
(45) Date of Patent: Aug. 6, 2024

(54) THERMOPLASTIC RESIN COMPOSITION AND MOLDED ARTICLE PRODUCED THEREFROM

(71) Applicant: LOTTE CHEMICAL CORPORATION, Seoul (KR)

(72) Inventors: Ki Hong Choi, Uiwang-si (KR); Tae Gon Kang, Uiwang-si (KR); Dong Yeop Shin, Uiwang-si (KR); Ye Seul Shin, Uiwang-si (KR); Sung Woo Yang, Uiwang-si (KR); Seo Yun Lee, Uiwang-si (KR); Dong In Ha, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

(21) Appl. No.: 17/825,134

(22) Filed: May 26, 2022

(65) Prior Publication Data
US 2022/0380597 A1 Dec. 1, 2022

(30) Foreign Application Priority Data

May 31, 2021 (KR) .......................... 10-2021-0069642

(51) Int. Cl.
C08L 69/00 (2006.01)
C08K 3/04 (2006.01)
(Continued)

(52) U.S. Cl.
CPC ................ C08L 69/00 (2013.01); C08K 3/04 (2013.01); C08K 3/34 (2013.01); C08K 7/06 (2013.01);
(Continued)

(58) Field of Classification Search
CPC ...... C08L 69/00; C08L 51/04; C08L 2201/02; C08K 3/04; C08K 7/14; C08K 3/22; C08K 3/34; C08K 3/346; C08K 5/523
See application file for complete search history.

(56) References Cited

U.S. PATENT DOCUMENTS

2004/0178383 A1* 9/2004 Kikuchi .................. C08L 69/00
252/62
2006/0247356 A1* 11/2006 Agarwal ................. C08L 69/00
524/502

(Continued)

FOREIGN PATENT DOCUMENTS

CN 108003587 A 5/2018
CN 110872431 A 3/2020
(Continued)

OTHER PUBLICATIONS

GB 1 577 548, Stabilized Pigmented Polycarbonate Composition, GE company, Filed Aug. 24, 1977.*
(Continued)

Primary Examiner — Marc S Zimmer
Assistant Examiner — Surbhi M Du
(74) Attorney, Agent, or Firm — Additon, Pendelton & Witherspoon, P.A.

(57) ABSTRACT

A thermoplastic resin composition comprises: about 100 parts by weight of a polycarbonate resin; about 3 parts by weight to about 20 parts by weight of a rubber-modified aromatic vinyl copolymer resin; about 12 parts by weight to about 28 parts by weight of talc having an average particle size of about 8 μm to about 20 μm and a blackness degree L* of less than about 90; about 5 parts by weight to about 20 parts by weight of acicular inorganic fillers; and about 10 parts by weight to about 30 parts by weight of a phosphorus flame retardant. The thermoplastic resin composition can
(Continued)

have good properties in terms of light shielding, impact resistance, dimensional stability, flame retardancy, balance therebetween, and the like.

12 Claims, 1 Drawing Sheet

(51) Int. Cl.
    *C08K 3/34*     (2006.01)
    *C08K 7/06*     (2006.01)
    *C08K 7/14*     (2006.01)
    *C08L 51/04*     (2006.01)

(52) U.S. Cl.
    CPC ............... *C08K 7/14* (2013.01); *C08L 51/04* (2013.01); *C08K 2201/005* (2013.01); *C08L 2201/02* (2013.01); *C08L 2201/08* (2013.01); *C08L 2203/20* (2013.01)

(56) References Cited

U.S. PATENT DOCUMENTS

| | | | |
|---|---|---|---|
| 2018/0118935 A1 | 5/2018 | Ha et al. | |
| 2020/0040181 A1 | 2/2020 | Ha et al. | |
| 2020/0071520 A1 | 3/2020 | Lee et al. | |

FOREIGN PATENT DOCUMENTS

| | | | |
|---|---|---|---|
| EP | 3527623 A1 | 8/2019 | |
| KR | 10-1534336 A | 6/2014 | |
| KR | 2019082098 A | * 7/2019 | ............... C08F 2/04 |

OTHER PUBLICATIONS

Office Action in counterpart Chinese Patent Application No. 202210597953.5 dated May 18, 2023, pp. 1-6.
Extended Search Report in counterpart European Application No. 22176327.9 dated Sep. 23, 2022, pp. 1-4.
Office Action in counterpart Chinese Patent Application No. 202210597953.5 dated Dec. 4, 2023, pp. 1-6.
Su Lei et al., "Study on preparation and properties of high-efficiency heat stabilizer with layered structure", Chemical Management, Issue 22, 2017, pp. 183-185 [With English Abstract] evaluation of high whiteness aluminum hydroxide filler sheets and calcium Issue 3, 2008, pp. 15-17 [With English Abstract].
Li Jun et al., "Property comparison and evaluation of high whiteness aluminum hydroxide filler sheets and calcium powder sheets", Fiber Composite Materials, Issue 3, 2008, pp. 15-17 [With English Abstract].

* cited by examiner

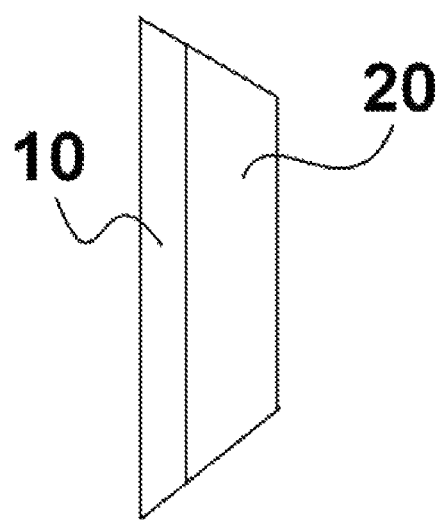

THERMOPLASTIC RESIN COMPOSITION AND MOLDED ARTICLE PRODUCED THEREFROM

CROSS-REFERENCE TO RELATED APPLICATION

This application claims priority under 35 USC Section 119 to and the benefit of Korean Patent Application No. 10-2021-0069642 filed in the Korean Intellectual Property Office on May 31, 2021, the entire disclosure of which is incorporated herein by reference.

FIELD

The present invention relates to a thermoplastic resin composition and a molded article produced therefrom.

BACKGROUND

Thermoplastic resin compositions are useful for housings of electrical/electronic products, automotive interior/exterior materials, and exterior materials for buildings due to lower specific gravity than glass or metal, good moldability, and good impact resistance. Particularly, with the trend toward larger and lighter electrical/electronic products, plastic products produced from thermoplastic resins are rapidly replacing typical glass and metal-based products in the art.

Among such thermoplastic resin compositions, a thermoplastic resin composition prepared by blending a polycarbonate (PC) resin with an aromatic vinyl copolymer resin, such as an acrylonitrile-butadiene-styrene (ABS) copolymer resin and the like, is used in various fields since the thermoplastic resin composition enables cost reduction and improvement in processability, chemical resistance and other properties with minimal or no deterioration in impact resistance and heat resistance of a polycarbonate resin.

When such a PC/ABS-based thermoplastic resin composition is used as a housing material for electric/electronic products, it is important to prevent transmission of light through the housing material. However, a thermoplastic resin composition containing pigments and inorganic fillers for light shielding can suffer from deterioration in mechanical properties such as impact resistance, flame retardancy, and the like.

Therefore, there is a need for development of a thermoplastic resin composition having good properties in terms of light shielding, impact resistance, dimensional stability, flame retardancy, and balance therebetween.

SUMMARY OF THE INVENTION

The present disclosure provides a thermoplastic resin composition that can have good properties in terms of light shielding, impact resistance, dimensional stability, flame retardancy, and balance therebetween, and a molded article produced therefrom.

The thermoplastic resin composition comprises: about 100 parts by weight of a polycarbonate resin; about 3 parts by weight to about 20 parts by weight of a rubber-modified aromatic vinyl copolymer resin; about 12 parts by weight to about 28 parts by weight of talc having an average particle size of about 8 μm to about 20 μm and a blackness degree L* of less than about 90; about 5 parts by weight to about 20 parts by weight of acicular inorganic fillers; and about 10 parts by weight to about 30 parts by weight of a phosphorus flame retardant.

In some embodiments, the rubber-modified aromatic vinyl copolymer resin may comprise a rubber-modified vinyl graft copolymer.

In some embodiments, the rubber-modified vinyl graft copolymer may be prepared through graft copolymerization of a monomer mixture comprising an aromatic vinyl monomer and a monomer copolymerizable with the aromatic vinyl monomer to a rubber polymer.

In some embodiments, the acicular inorganic fillers may comprise wollastonite, glass fiber, carbon fiber, and/or basalt fiber.

In some embodiments, the talc and the acicular inorganic fillers may be present in a weight ratio of about 1:0.2 to about 1:1.5.

In some embodiments, the thermoplastic resin composition may further comprise about 5 to about 15 parts by weight of a dye and/or a pigment relative to about 100 parts by weight of the polycarbonate resin.

In some embodiments, the thermoplastic resin composition may have a light transmittance of about 0.16% or less, as measured on a 1 mm thick specimen in accordance with ASTM D1003.

In some embodiments, the thermoplastic resin composition may have a notched Izod impact strength of about 5.5 kgf·cm/cm to about 20 kgf·cm/cm, as measured on a ⅛" specimen in accordance with ASTM D256.

In some embodiments, the thermoplastic resin composition may have a coefficient of linear expansion of about 30 μm/m·° C. to about 50 μm/m·° C., as measured on an injection-molded specimen having a size of 10 mm×10 mm×6.4 mm while raising a temperature from 0° C. to 60° C. at a rate of 5° C./min in accordance with ASTM D696.

In some embodiments, the thermoplastic resin composition may have a flame retardancy of V-1 or higher, as measured on a 1.0 mm thick injection molded-specimen by a UL-94 vertical test method.

The present disclosure also relates to a molded article. The molded article is formed of the thermoplastic resin composition according to any of the embodiments of the present disclosure.

In some embodiments, the molded article may be a plastic member of an electronic device housing, wherein the electronic device housing includes a metal frame and the plastic member, the plastic member adjoining at least one surface of the metal frame.

BRIEF DESCRIPTION OF THE DRAWINGS

FIG. 1 a schematic sectional view of an electronic device housing according to one embodiment of the present disclosure.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

Hereinafter, embodiments of the present invention will be described in detail.

A thermoplastic resin composition according to the present disclosure comprises: (A) a polycarbonate resin; (B) a rubber-modified aromatic vinyl copolymer resin; (C) talc; (D) acicular inorganic fillers; (E) a phosphorus flame retardant.

As used herein to represent a specific numerical range, "a to b" means "≥ a and ≤ b".

(A) Polycarbonate Resin

The polycarbonate resin according to embodiments of the present disclosure may comprise any typical polycarbonate resin used in thermoplastic resin compositions. For example, the polycarbonate resin may be an aromatic polycarbonate resin prepared by reacting diphenol(s) (aromatic diol compound(s)) with a precursor, such as phosgene, halogen formate, and/or carbonate diester.

Examples of the diphenols may comprise 4,4'-biphenol, 2,2-bis(4-hydroxyphenyl)-propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and the like, and mixtures and/or combinations thereof, without being limited thereto. For example, the diphenol(s) may include 2,2-bis(4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and/or 1,1-bis(4-hydroxyphenyl)cyclohexane, for example 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, for example, a tri- or higher valent phenol group-containing compound, in an amount of about 0.05 mol % to about 2 mol % based on the total number of moles of the diphenol(s) used in polymerization.

In some embodiments, the polycarbonate resin may be a homopolycarbonate resin, a copolycarbonate resin, or a blend thereof. In addition, the polycarbonate resin may be partly or completely replaced by an aromatic polyester-carbonate resin prepared by polymerization in the presence of an ester precursor, for example, a bifunctional carboxylic acid.

In some embodiments, the polycarbonate resin may have a weight average molecular weight (Mw) of about 18,000 g/mol to about 50,000 g/mol, for example, about 25,000 g/mol to about 40,000 g/mol, as measured by gel permeation chromatography (GPC). Within this range, the thermoplastic resin composition can have good impact resistance, fluidity (processability), and the like.

In some embodiments, the polycarbonate resin may have a melt-flow index (MI) of about 5 g/10 min to about 80 g/10 min, as measured at 300° C. under a load of 1.2 kgf in accordance with ISO 1133. Alternatively, the polycarbonate resin may be a mixture of at least two polycarbonate resins having different melt flow indexes (e.g., a mixture of at least two or more polycarbonate resins, each having a different melt-flow index (MI) within the range of about 5 g/10 min to about 80 g/10 min).

(B) Rubber-Modified Aromatic Vinyl Copolymer Resin

A rubber-modified aromatic vinyl copolymer resin according to embodiments of the present disclosure may comprise (B1) a rubber-modified vinyl graft copolymer; or (B1) a rubber-modified vinyl graft copolymer and (B2) an aromatic vinyl copolymer resin.

(B1) Rubber-Modified Vinyl Graft Copolymer

The rubber-modified vinyl graft copolymer according to embodiments of the present disclosure may be prepared by graft polymerization of a monomer mixture comprising an aromatic vinyl monomer and a monomer copolymerizable with the aromatic vinyl monomer to a rubber polymer. For example, the rubber-modified vinyl graft copolymer may be prepared by graft polymerization of the monomer mixture comprising the aromatic vinyl monomer and the monomer copolymerizable with the aromatic vinyl monomer to the rubber polymer, in which the monomer copolymerizable with the aromatic vinyl monomer comprises a vinyl cyanide monomer, a monomer for imparting processability and heat resistance, or a mixture and/or combination thereof. Here, polymerization may be performed by any polymerization method known in the art, such as emulsion polymerization, suspension polymerization, and the like. In addition, the rubber-modified vinyl graft copolymer may have a core (rubber polymer)-shell (copolymer of the monomer mixture) structure, without being limited thereto.

Examples of the rubber polymer may include without limitation diene rubbers, such as polybutadiene and/or poly(acrylonitrile-butadiene); saturated rubbers prepared by adding hydrogen to the diene rubbers; isoprene rubbers; $C_2$ to $C_{10}$ alkyl (meth)acrylate rubbers; copolymers of $C_2$ to $C_{10}$ alkyl (meth)acrylate and styrene; and ethylene-propylene-diene monomer terpolymers (EPDM). These may be used alone or as a mixture and/or combination thereof. For example, the rubber polymer may comprise diene rubbers and (meth)acrylate rubbers, specifically butadiene rubbers and butyl acrylate rubbers.

In some embodiments, the rubber polymer (rubber particle) may have an average particle diameter of about 0.05 μm to about 6 for example, about 0.15 μm to about 4 and as another example about 0.25 μm to about 3.5 Within this range, the thermoplastic resin composition can have good properties in terms of impact resistance, external appearance, and the like. Here, the average particle diameter (z-average) of the rubber polymer (rubber particles) may be measured by a light scattering method in a latex state using techniques and equipment known in the art. For example, a rubber polymer latex can be filtered through a mesh to remove coagulum generated during polymerization of the rubber polymer. Then, a mixed solution of 0.5 g of the latex and 30 ml of distilled water can be placed in a 1,000 ml flask, which in turn can be filled with distilled water to prepare a specimen. Then, 10 ml of the specimen can be transferred to a quartz cell, followed by measurement of the average particle diameter of the rubber polymer using a light scattering particle analyzer (e.g., Malvern Co., Ltd., Nano-zs).

In some embodiments, the rubber-modified vinyl graft copolymer may include the rubber polymer in an amount of about 20 wt % to about 80 wt %, for example, about 25 wt % to about 70 wt %, based on 100 wt % of the rubber-modified vinyl graft copolymer. In some embodiments, the rubber-modified vinyl graft copolymer may include the rubber polymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 wt %, based on 100 wt % of the rubber-modified vinyl graft copolymer. Further, according to some embodiments, the rubber polymer can be present in an amount of from about any of the foregoing amounts to about any other of the foregoing amounts.

In some embodiments, the rubber-modified vinyl graft copolymer may include the monomer mixture in an amount of about 20 wt % to about 80 wt %, for example, about 30 wt % to about 75 wt %, based on 100 wt % of the rubber-modified vinyl graft copolymer. In some embodiments, the rubber-modified vinyl graft copolymer may include the monomer mixture in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 wt %, based on 100 wt % of the rubber-modified vinyl graft copolymer. Further, according to some embodiments, the monomer mixture can be present in an amount of from about any of the foregoing amounts to about any other of the foregoing amounts.

Within these ranges, the thermoplastic resin composition can have good properties in terms of impact resistance, heat resistance, processability, external appearance, and the like.

In some embodiments, the aromatic vinyl monomer may be graft copolymerizable with the rubber polymer. Examples of the aromatic vinyl monomer may include without limitation styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene, and the like. These may be used alone or as a mixture and/or combination thereof.

The monomer mixture may include the aromatic vinyl monomer in an amount of about 10 wt % to about 90 wt %, for example, about 20 wt % to about 80 wt %, based on 100 wt % of the monomer mixture. In some embodiments, the monomer mixture may include the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %, based on 100 wt % of the monomer mixture. Further, according to some embodiments, the aromatic vinyl monomer can be present in an amount of from about any of the foregoing amounts to about any other of the foregoing amounts. Within this range, the thermoplastic resin composition can have good properties in terms of processability, impact resistance, and the like.

In some embodiments, a vinyl cyanide monomer can be the monomer that is copolymerizable with the aromatic vinyl monomer. Examples of the vinyl cyanide monomer may include without limitation acrylonitrile, methacrylonitrile, ethacrylonitrile, phenyl acrylonitrile, α-chloroacrylonitrile, fumaronitrile, and the like. These may be used alone or as a mixture and/or combination thereof. For example, the vinyl cyanide monomer may comprise acrylonitrile, methacrylonitrile, and the like.

In some embodiments, examples of the monomer for imparting processability and heat resistance may comprise (meth)acrylic acid, $C_1$ to $C_{10}$ alkyl (meth)acrylates, maleic anhydride, N-substituted maleimide, and the like, and mixtures and/or combinations thereof, without being limited thereto.

In some embodiments, the rubber-modified vinyl graft copolymer may comprise a copolymer (g-ABS) prepared by grafting a styrene monomer as the aromatic vinyl monomer and an acrylonitrile monomer as the vinyl cyanide monomer to a butadiene rubber polymer, a copolymer (g-MBS) prepared by grafting a styrene monomer as the aromatic vinyl monomer and methyl methacrylate as the monomer copolymerizable therewith to a butadiene rubber polymer, a copolymer (g-MABS) prepared by grafting a styrene monomer, an acrylonitrile monomer and methyl methacrylate to a butadiene rubber polymer, an acrylate-styrene-acrylonitrile graft copolymer (g-ASA) prepared by grafting a styrene monomer as the aromatic vinyl monomer and an acrylonitrile monomer as the vinyl cyanide monomer to a butyl acrylate rubber polymer, and the like and mixtures and/or combinations thereof. For example, g-MBS and the like may be used.

(B2) Aromatic Vinyl Copolymer Resin

The aromatic vinyl copolymer resin according to embodiments of the present disclosure may comprise an aromatic vinyl copolymer resin used in typical rubber-modified aromatic vinyl copolymer resins. For example, the aromatic vinyl copolymer resin may be a polymer of a monomer mixture comprising an aromatic vinyl monomer and a monomer copolymerizable with the aromatic vinyl monomer.

In some embodiments, the aromatic vinyl copolymer resin may be prepared by mixing the aromatic vinyl monomer with the monomer copolymerizable with the aromatic vinyl monomer, followed by polymerization of the mixture. Here, polymerization may be performed by any suitable polymerization method known in the art, such as emulsion polymerization, suspension polymerization, bulk polymerization, and the like.

Examples of the aromatic vinyl monomer may include without limitation styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene, and the like. These may be used alone or as a mixture and/or combination thereof.

The aromatic vinyl copolymer resin may include the aromatic vinyl monomer in an amount of about 10 wt % to about 95 wt %, for example, about 20 wt % to about 90 wt %, based on 100 wt % of the aromatic vinyl copolymer resin. In some embodiments, the aromatic vinyl copolymer resin may include the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %, based on 100 wt % of the aromatic vinyl copolymer resin. Further, according to some embodiments, the aromatic vinyl monomer can be present in an amount of from about any of the foregoing amounts to about any other of the foregoing amounts. Within this range, the thermoplastic resin composition can have good properties in terms of impact resistance, fluidity, and the like.

Examples of the monomer copolymerizable with the aromatic vinyl monomer may include without limitation a vinyl cyanide monomer and/or an alkyl (meth)acrylic monomer. For example, the monomer copolymerizable with the aromatic vinyl monomer may comprise a vinyl cyanide monomer or a vinyl cyanide monomer and an alkyl (meth) acrylic monomer.

Examples of the vinyl cyanide monomer may include without limitation acrylonitrile, methacrylonitrile, ethacrylonitrile, phenyl acrylonitrile, α-chloroacrylonitrile, fumaronitrile, and the like. These monomers may be used alone or as a mixture and/or combination thereof. For example, the vinyl cyanide monomer may comprise acrylonitrile, methacrylonitrile, and the like.

Examples of the alkyl (meth)acrylic monomer may include without limitation (meth)acrylic acid and/or $C_1$ to $C_{10}$ alkyl (meth)acrylates. These monomers may be used alone or as a mixture and/or combination thereof. For example, methyl methacrylate, methyl acrylate and the like may be used.

The aromatic vinyl copolymer resin may include the monomer copolymerizable with the aromatic vinyl monomer in an amount of about 5 wt % to about 90 wt %, for example, about 10 wt % to about 80 wt %, based on 100 wt % of the aromatic vinyl copolymer resin. In some embodiments, the aromatic vinyl copolymer resin may include the monomer copolymerizable with the aromatic vinyl monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %, based on 100 wt % of the aromatic vinyl copolymer resin. Further, according to some embodiments, the monomer copolymerizable with the aromatic vinyl monomer can be present in an amount of from about any of the foregoing amounts to about any other of the foregoing amounts. Within this range, the thermoplastic resin composition can have good properties in terms of impact resistance, fluidity, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good mechanical strength, moldability, and the like.

In some embodiments, when the aromatic vinyl copolymer resin is present, the rubber-modified vinyl graft copolymer may be present in an amount of about 10 wt % to about 50 wt %, for example, about 20 wt % to about 45 wt %, based on 100 wt % of the rubber-modified aromatic vinyl copolymer resin, and the aromatic vinyl copolymer resin may be present in an amount of about 50 to about 90 wt %, for example, about 55 wt % to about 80 wt %, based on 100 wt % of the rubber-modified aromatic vinyl copolymer resin.

In these embodiments, the rubber-modified aromatic vinyl copolymer resin may include the rubber-modified vinyl graft copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %, based on 100 wt % of the rubber-modified aromatic vinyl copolymer resin. Further, according to some embodiments, the rubber-modified vinyl graft copolymer can be present in an amount of from about any of the foregoing amounts to about any other of the foregoing amounts.

Also in these embodiments, the rubber-modified aromatic vinyl copolymer resin may include the aromatic vinyl copolymer resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %, based on 100 wt % of the rubber-modified aromatic vinyl copolymer resin. Further, according to some embodiments, the aromatic vinyl copolymer resin can be present in an amount of from about any of the foregoing amounts to about any other of the foregoing amounts.

Within these ranges, the thermoplastic resin composition can exhibit good properties in terms of impact resistance, fluidity (molding processability), and the like.

In some embodiments, the thermoplastic resin composition may include the rubber-modified aromatic vinyl copolymer resin in an amount of about 3 parts by weight to about 20 parts by weight, for example, about 5 parts by weight to about 15 parts by weight, relative to about 100 parts by weight of the polycarbonate resin. In some embodiments, the thermoplastic resin composition may include the rubber-modified aromatic vinyl copolymer resin in an amount of about 3, 4, 5, 6, 7, 8, 9, 10, 11, 12, 13, 14, 15, 16, 17, 18, 19, or 20 parts by weight, relative to about 100 parts by weight of the polycarbonate resin. Further, according to some embodiments, the rubber-modified aromatic vinyl copolymer resin can be present in an amount of from about any of the foregoing amounts to about any other of the foregoing amounts.

If the content of the rubber-modified aromatic vinyl copolymer resin is less than about 3 parts by weight relative to about 100 parts by weight of the polycarbonate resin, the thermoplastic resin composition can suffer from deterioration in impact resistance and the like, and if the content of the rubber-modified aromatic vinyl copolymer resin exceeds about 20 parts by weight, the thermoplastic resin composition can suffer from deterioration in flame retardancy, heat stability, dimensional stability, and the like.

(C) Talc

According to embodiments of the present disclosure, talc can be used in a small amount together with the acicular inorganic fillers and the phosphorus flame retardant to improve various properties of the thermoplastic resin composition comprising the polycarbonate resin and the rubber-modified aromatic vinyl copolymer resin in terms of light shielding, impact resistance, dimensional stability, flame retardancy and balance therebetween. The talc has an average particle diameter (size) of about 8 μm to about 20 μm and a blackness degree L* of less than about 90.

In some embodiments, the talc may be flake inorganic fillers and may have an average particle diameter (size) of about 8 μm to about 20 μm, for example, about 9 μm to about 13 μm, as measured by a particle analyzer using techniques and equipment known in the art (e.g., Malvern Mastersizer 3000). In some embodiments, the talc may have an average particle diameter of about 8, 9, 10, 11, 12, 13, 14, 15, 16, 17, 18, 19, or 20 μm. Further, according to some embodiments, the talc can have an average particle diameter of from about any of the foregoing average particle diameters to about any other of the foregoing average particle diameters. If the talc has an average particle diameter outside this range, the thermoplastic resin composition can suffer from deterioration in light shielding, impact resistance, and the like.

In some embodiments, the talc may have a blackness degree L* of less than about 90, for example, about 80 to about 89, as measured using techniques and equipment known in the art (e.g., using a Minolta colorimeter (CM-2500C)). In some embodiments, the talc may have a blackness degree L* of about 80, 81, 82, 83, 84, 85, 86, 87, 88, or 89. Further, according to some embodiments, the talc may have a blackness degree L* of from about any of the foregoing blackness degree L* to about any other of the foregoing blackness degree L*. If the blackness degree L* of the talc is about 90 or more, the thermoplastic resin composition can suffer from deterioration in light shielding property and the like.

In some embodiments, the thermoplastic resin composition may include the talc in an amount of about 12 parts by weight to about 28 parts by weight, for example, about 15 parts by weight to about 25 parts by weight, relative to about 100 parts by weight of the polycarbonate resin. In some embodiments, the thermoplastic resin composition may include the talc in an amount of about 12, 13, 14, 15, 16, 17, 18, 19, 20, 21, 22, 23, 24, 25, 26, 27, or 28 parts by weight, relative to about 100 parts by weight of the polycarbonate resin. Further, according to some embodiments, the talc can be present in an amount of from about any of the foregoing amounts to about any other of the foregoing amounts.

If the content of the talc is less than about 12 parts by weight relative to about 100 parts by weight of the polycarbonate resin, the thermoplastic resin composition can suffer from deterioration in light shielding property, dimensional stability, and the like, and if the content of the talc exceeds about 28 parts by weight, the thermoplastic resin composition can suffer from deterioration in impact resistance, heat stability, and the like.

(D) Acicular Inorganic Fillers

The acicular inorganic fillers according to embodiments of the present disclosure are used together with talc and the phosphorus flame retardant to improve properties of the thermoplastic resin composition comprising the polycarbonate resin and the rubber-modified aromatic vinyl copolymer resin in terms of light shielding, impact resistance, dimensional stability, flame retardancy, and balance therebetween.

Examples of the acicular inorganic fillers may include without limitation wollastonite, glass fiber, carbon fiber, basalt fiber, and the like, and mixtures and/or combinations thereof. For example, wollastonite may be used.

In some embodiments, wollastonite may be a white acicular calcium-based mineral and may be subjected to hydrophobic surface treatment on at least part of a surface thereof. Here, hydrophobic surface treatment may comprise, for example, coating wollastonite with an olefin, epoxy or silane material, without being limited thereto.

In some embodiments, the acicular inorganic fillers may have a cross-section diameter of about 5 μm to about 20 μm, for example, about 10 μm to about 15 μm, a pre-processing length of about 10 mm to about 500 mm, and a post-processing length of about 50 μm to about 200 μm, for example, about 100 μm to about 150 μm, as measured using a particle analyzer using techniques and equipment known in the art (e.g., Malvern Mastersizer 3000). Within this range, the thermoplastic resin composition can exhibit good properties in terms of dimensional stability, impact resistance, and the like.

In some embodiments, the thermoplastic resin composition may include the acicular inorganic fillers in an amount of about 5 parts by weight to about 20 parts by weight, for example, about 7 parts by weight to about 17 parts by weight, relative to about 100 parts by weight of the polycarbonate resin. In some embodiments, the thermoplastic resin composition may include the acicular inorganic fillers in an amount of about 5, 6, 7, 8, 9, 10, 11, 12, 13, 14, 15, 16, 17, 18, 19, or 20 parts by weight, relative to about 100 parts by weight of the polycarbonate resin. Further, according to some embodiments, the acicular inorganic fillers can be present in an amount of from about any of the foregoing amounts to about any other of the foregoing amounts.

If the content of the acicular inorganic fillers is less than about 5 parts by weight relative to about 100 parts by weight of the polycarbonate resin, the thermoplastic resin composition can suffer from deterioration in light shielding, dimensional stability, and the like, and if the content of the acicular inorganic fillers exceeds about 20 parts by weight, the thermoplastic resin composition can suffer from deterioration in impact resistance, fluidity, external appearance, and the like.

In some embodiments, the talc (C) and the acicular inorganic fillers (D) may be present in a weight ratio (C:D) of about 1:0.2 to about 1:1.5, for example, about 1:0.3 to about 1:1. In some embodiments, the talc (C) and the acicular inorganic fillers (D) may be present in a weight ratio (C:D) of about 1:0.2, 1:0.3, 1:0.4, 1:0.5, 1:0.6, 1:0.7, 1:0.8, 1:0.9, 1:1, 1:1.1, 1:1.2, 1:1.3, 1:1.4, or 1:1.5. Further, according to some embodiments, the talc (C) and the acicular inorganic fillers (D) may be present in a weight ratio (C:D) of from about any of the foregoing ratios to about any other of the foregoing ratios. Within this range, the thermoplastic resin composition can exhibit good properties in terms of light shielding, impact resistance, dimensional stability, and the like.

(E) Phosphorus Flame Retardant

The phosphorus flame retardant according to embodiments of the present disclosure may comprise any typical phosphorus flame retardant used in typical flame retardant thermoplastic resin compositions. Examples of the phosphorus flame retardant may include without limitation a phosphate compound, a phosphonate compound, a phosphinate compound, a phosphine oxide compound, a phosphazene compound, a metal salt thereof, and the like. These compounds may be used alone or as a mixture and/or combination thereto.

In some embodiments, the phosphorus flame retardant may comprise an aromatic phosphoric ester compound represented by Formula 1:

[Formula 1]

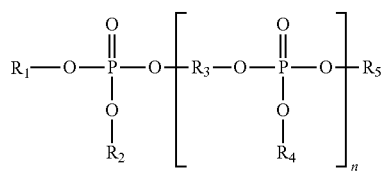

wherein $R_1$, $R_2$, $R_4$ and $R_5$ are each independently a hydrogen atom, a $C_6$ to $C_{20}$ (6 to 20 carbon atoms) aryl group, or a $C_1$ to $C_{10}$ alkyl group-substituted $C_6$ to $C_{20}$ aryl group; $R_3$ is a $C_6$ to $C_{20}$ arylene group or a $C_1$ to $C_{10}$ alkyl group-substituted $C_6$ to $C_{20}$ arylene group, for example, derivatives of a dialcohol, such as resorcinol, hydroquinone, bisphenol-A, or bisphenol-S; and n is an integer of 0 to 10, for example, 0 to 4.

When n is 0 in Formula 1, examples of the aromatic phosphoric ester compound may include without limitation diaryl phosphates, such as diphenyl phosphate and the like, triphenyl phosphate, tricresyl phosphate, trixylenyl phosphate, tri(2,6-dimethylphenyl) phosphate, tri(2,4,6-trimethylphenyl)phosphate, tri(2,4-di-tert-butylphenyl) phosphate, tri(2,6-dimethylphenyl)phosphate, and the like; and when n is 1 in Formula 1, examples of the aromatic phosphoric ester compound may include without limitation bisphenol-A bis (diphenyl phosphate), resorcinol bis(diphenyl phosphate), resorcinol bis[bis(2,6-dimethylphenyl)phosphate], resorcinol bis[bis(2,4-di-tert-butylphenyl)phosphate], hydroquinone bis[bis(2,6-dimethylphenyl)phosphate], hydroquinone bis[bis(2,4-di-tert-butylphenyl)phosphate], and the like. These compounds may be used alone or as a mixture and/or combination thereof.

In some embodiments, the thermoplastic resin composition may include the phosphorus flame retardant in an amount of about 10 parts by weight to about 30 parts by weight, for example, about 15 parts by weight to about 25 parts by weight, relative to about 100 parts by weight of the polycarbonate resin. In some embodiments, the thermoplastic resin composition may include the phosphorus flame retardant in an amount of about 10, 11, 12, 13, 14, 15, 16, 17, 18, 19, 20, 21, 22, 23, 24, 25, 26, 27, 28, 29, or 30 parts by weight, relative to about 100 parts by weight of the polycarbonate resin. Further, according to some embodiments, the phosphorus flame retardant can be present in an amount of from about any of the foregoing amounts to about any other of the foregoing amounts.

If the content of the phosphorus flame retardant is less than about 10 parts by weight relative to about 100 parts by weight of the polycarbonate resin, the thermoplastic resin composition can suffer from deterioration in flame retardancy, fluidity, and the like, and if the content of the phosphorus flame retardant exceeds about 30 parts by weight, the thermoplastic resin composition can suffer from deterioration in impact resistance, heat resistance, and the like.

The thermoplastic resin composition according to embodiments of the present disclosure may further comprise a dye and/or pigment used in a typical thermoplastic resin composition to impart a color to a molded article while improving light shielding and the like.

In some embodiments, the thermoplastic resin composition may include the dye(s) and/or pigment(s) in an amount of about 5 parts by weight to about 15 parts by weight, for example, about 6 parts by weight to about 10 parts by weight, relative to about 100 parts by weight of the polycarbonate resin. In some embodiments, the thermoplastic resin composition may include the dye(s) and/or pigment(s) in an amount of about 5, 6, 7, 8, 9, 10, 11, 12, 13, 14, or 15 parts by weight, relative to about 100 parts by weight of the polycarbonate resin. Further, according to some embodiments, the dye(s) and/or pigment(s) can be present in an amount of from about any of the foregoing amounts to about any other of the foregoing amounts.

Within this range, the thermoplastic resin composition (molded article) can exhibit a good color, good light shielding, and the like.

The thermoplastic resin composition according to embodiments of the present disclosure may further comprise one or more additives. Examples of the additives may include without limitation antioxidants, anti-dripping agents, lubricants, release agents, anti-static agents, stabilizers, and the like, and mixtures and/or combinations thereof. The thermoplastic resin composition may include the additive(s) in an amount of about 0.001 parts by weight to about 40 parts by weight, for example, about 0.1 parts by weight to about 10 parts by weight, relative to about 100 parts by weight of the polycarbonate resin. In some embodiments, the thermoplastic resin composition may include the additive(s) in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight, relative to about 100 parts by weight of the polycarbonate resin. Further, according to some embodiments, the additive(s) can be present in an amount of from about any of the foregoing amounts to about any other of the foregoing amounts.

The thermoplastic resin composition according to embodiments of the present disclosure may be prepared in pellet form by mixing the aforementioned components, followed by melt extrusion in a typical twin-screw type extruder at about 240° C. to about 300° C., for example, at about 250° C. to about 290° C.

In some embodiments, the thermoplastic resin composition may have a light transmittance of about 0.16% or less, for example, about 0.01% to about 0.15%, as measured on a 1 mm thick specimen in accordance with ASTM D1003. In some embodiments, the thermoplastic resin composition may have a light transmittance of about 0.01, 0.02, 0.03, 0.04, 0.05, 0.06, 0.07, 0.08, 0.09, 0.10, 0.11, 0.12, 0.13, 0.14, 0.15, or 0.16%. Further, according to some embodiments, the thermoplastic resin composition may have a light transmittance of from about any of the foregoing light transmittances to about any other of the foregoing light transmittances.

In some embodiments, the thermoplastic resin composition may have a notched Izod impact strength of about 5.5 kgf·cm/cm to about 20 kgf cm/cm, for example, about 5.7 kgf·cm/cm to about 15 kgf·cm/cm, as measured on a ⅛" specimen in accordance with ASTM D256. In some embodiments, the thermoplastic resin composition may have a notched Izod impact strength of about 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 kgf·cm/cm. Further, according to some embodiments, the thermoplastic resin composition may have a notched Izod impact strength of from about any of the foregoing notched Izod impact strengths to about any other of the foregoing notched Izod impact strengths.

In some embodiments, the thermoplastic resin composition may have a coefficient of linear expansion of about 30 μm/m·° C. to about 50 μm/m·° C., for example, about 31 μm/m·° C. to about 48 μm/m·° C., as measured on an injection-molded specimen having a size of 10 mm×10 mm×6.4 mm while raising a temperature from 0° C. to 60° C. at a rate of 5° C./min in accordance with ASTM D696. In some embodiments, the thermoplastic resin composition may have a coefficient of linear expansion of about 30, 31, 32, 33, 34, 35, 36, 37, 38, 39, 40, 41, 42, 43, 44, 45, 46, 47, 48, 49, or 50 μm/m·° C. Further, according to some embodiments, the thermoplastic resin composition may have a coefficient of linear expansion of from about any of the foregoing coefficients of linear expansion to about any other of the foregoing coefficients of linear expansion.

In some embodiments, the thermoplastic resin composition may have a flame retardancy of V-1 or higher (e.g., V-1 or V-0), as measured on a 1.0 mm thick specimen by a UL-94 vertical test method.

The present disclosure also relates to a molded article formed of the thermoplastic resin composition.

In some embodiments, the molded article may be a plastic member of a housing of an electronic product (device), wherein the housing comprises a metal frame and the plastic member, and wherein the plastic member adjoins at least one surface of the metal frame.

FIG. 1 is a schematic sectional view of a housing of an electronic product according to one embodiment of the present invention. It should be understood that the drawings are not to precise scale and the dimensions of components are exaggerated for clarity of description in the drawings. Referring to FIG. 1, the housing of an electronic product according to one embodiment comprises a metal frame 10 and at least one plastic member 20 adjoining at least one surface of the metal frame 10, wherein the plastic member is formed of the thermoplastic resin composition according to the embodiments of the present disclosure.

In some embodiments, the metal frame 10 and the plastic member 20 may have various shapes without being limited to the shapes shown in the drawings. The metal frame 10 and the plastic member 20 form an adjoining structure in which the metal frame 10 adjoins at least one surface of the plastic member 20. The adjoining structure may be realized by bonding or insertion, but is not limited thereto.

In some embodiments, the metal frame 10 may be a stainless steel frame or may be selected from the group of any commercially available products, which can be used as a typical housing of electronic products.

In some embodiments, the plastic member 20 may be formed of the thermoplastic resin composition by various molding methods, such as injection molding, extrusion molding, vacuum molding, casting, and the like. For example, the plastic member 20 may be formed by hot-water molding, steam molding (RHCM (rapid heat cycle molding)) or the like, and may be a front cover and/or a rear cover of a 22″ to 85″ thin film type TV, a thin film monitor, and the like. The plastic member 20 is applicable to external appearance specifications, such as a hairline pattern, a corrosion pattern, and the like.

Next, the present disclosure will be described in more detail with reference to the following examples. However, it should be noted that these examples are provided for illustration only and should not be construed in any way as limiting the invention.

EXAMPLE

Details of components used in Examples and Comparative Examples are as follows.

(A) Polycarbonate Resin

A bisphenol-A polycarbonate resin (weight average molecular weight: 25,000 g/mol) is used.

(B) Rubber-Modified Aromatic Vinyl Copolymer Resin

A rubber-modified vinyl graft copolymer (g-MBS, Manufacturer: Dow, Product Name: EXL2616) prepared through graft copolymerization of a monomer mixture comprising styrene and methyl methacrylate to butadiene rubbers having an average particle diameter of 0.15 μm is used.

(C) Talc (C1) Talc (Manufacturer: KOCH, Product Name: KCP-04, Average particle size: 12 μm, Blackness degree (L* value): 85) is used.

(C2) Talc (Manufacturer: KOCH, Product Name: KCKA-400, Average particle size: 12 μm, Blackness degree (L* value): 90) is used.

(C3) Talc (Manufacturer: KOCH, Product Name: KCM-6300C, Average particle size: 12 μm, Blackness degree (L* value): 95) is used.

(C4) Talc (Manufacturer: KOCH, Product Name: KCP-2000, Average particle size: 5 μm, Blackness degree (L* value): 85) is used.

(C5) Talc (Manufacturer: KOCH, Product Name: NAP-400, Average particle size: 21 μm, Blackness degree (L* value): 85) is used.

(D) Acicular Inorganic Fillers

Wollastonite (Manufacturer: Hubei, Product Name: W4101, Average particle size: 6 μm) is used.

(E) Phosphorus Flame Retardant

An oligomer type bisphenol-A diphosphate (Manufacturer: Yoke Chemical, Product Name: YOKE BDP) is used.

(F) Pigment

As a white pigment, titanium dioxide ($TiO_2$, Manufacturer: CITIC Titanium Industry, Product Name: CR-211) is used.

Examples 1 to 11 and Comparative Examples 1 to 12

The aforementioned components are mixed in amounts as listed in Tables 1, 2, 3 and 4, followed by extrusion at 250° C., thereby preparing a thermoplastic resin composition in pellet form. Here, extrusion is performed using a twin-screw extruder (L/D: 44, Φ: 45 mm). The prepared pellets are dried at 80° C. for 4 hours or more and then subjected to injection molding using a 6 oz. injection machine (molding temperature: 250° C., mold temperature: 60° C.), thereby preparing a specimen. The prepared specimen is evaluated as to the following properties. Results are shown in Tables 1, 2, 3 and 4.

Property Evaluation (1) Light shielding property: Light transmittance (total light transmittance, unit: %) is measured on a 1 mm thick specimen using a haze meter NDH 2000 (Nippon Denshoku Co., Ltd.) in accordance with ASTM D1003.

(2) Impact resistance: Notched Izod impact strength (unit: kgf·cm/cm) is measured on a ⅛″ thick specimen in accordance with ASTM D256.

(3) Dimensional stability: Coefficient of linear expansion (unit: μm/m·° C.) is measured on an injection-molded specimen having a size of 10 mm×10 mm×6.4 mm while raising the temperature from 0° C. to 60° C. at a rate of 5° C./min in accordance with ASTM D696.

(4) Flame retardancy: Flame retardancy is measured on a 1.0 mm thick injection-molded specimen in accordance with the UL 94 vertical test standard.

TABLE 1

| | Example | | | | |
|---|---|---|---|---|---|
| | 1 | 2 | 3 | 4 | 5 |
| (A) (parts by weight) | 100 | 100 | 100 | 100 | 100 |
| (B) (parts by weight) | 10 | 5 | 15 | 10 | 10 |
| (C1) (parts by weight) | 18 | 18 | 18 | 15 | 25 |
| (C2) (parts by weight) | — | — | — | — | — |
| (C3) (parts by weight) | — | — | — | — | — |
| (C4) (parts by weight) | — | — | — | — | — |
| (C5) (parts by weight) | — | — | — | — | — |
| (D) (parts by weight) | 12 | 12 | 12 | 12 | 12 |
| (E) (parts by weight) | 21 | 21 | 21 | 21 | 21 |
| (F) (parts by weight) | — | — | — | — | — |
| Light transmittance (%) | 0.12 | 0.12 | 0.12 | 0.15 | 0.09 |
| Notched Izod impact strength (kgf·cm/cm) | 7.3 | 6.6 | 7.9 | 7.6 | 6.8 |
| Coefficient of linear expansion (μm/m·° C.) | 39 | 37 | 42 | 43 | 33 |
| Flame retardancy (1.0 T) | V-1 | V-1 | V-1 | V-1 | V-1 |

TABLE 2

| | Example | | | | | |
|---|---|---|---|---|---|---|
| | 6 | 7 | 8 | 9 | 10 | 11 |
| (A) (parts by weight) | 100 | 100 | 100 | 100 | 100 | 100 |
| (B) (parts by weight) | 10 | 10 | 10 | 10 | 10 | 10 |
| (C1) (parts by weight) | 18 | 18 | 18 | 18 | 18 | 20 |
| (C2) (parts by weight) | — | — | — | — | — | — |

TABLE 2-continued

|  | Example | | | | | |
|---|---|---|---|---|---|---|
|  | 6 | 7 | 8 | 9 | 10 | 11 |
| (C3) (parts by weight) | — | — | — | — | — | — |
| (C4) (parts by weight) | — | — | — | — | — | — |
| (C5) (parts by weight) | — | — | — | — | — | — |
| (D) (parts by weight) | 7 | 17 | 12 | 12 | 12 | 12 |
| (E) (parts by weight) | 21 | 21 | 15 | 25 | 21 | 21 |
| (F) (parts by weight) | — | — | — | — | 8 | 6 |
| Light transmittance (%) | 0.13 | 0.10 | 0.12 | 0.12 | 0.01 | 0.02 |
| Notched Izod impact strength (kgf · cm/cm) | 7.5 | 6.9 | 7.5 | 6.2 | 5.7 | 6.2 |
| Coefficient of linear expansion (μm/m · °C.) | 46 | 31 | 38 | 39 | 38 | 36 |
| Flame retardancy | V-1 | V-1 | V-1 | V-1 | V-1 | V-1 |

TABLE 3

|  | Comparative Example | | | | | |
|---|---|---|---|---|---|---|
|  | 1 | 2 | 3 | 4 | 5 | 6 |
| (A) (parts by weight) | 100 | 100 | 100 | 100 | 100 | 100 |
| (B) (parts by weight) | 1 | 25 | 10 | 10 | 10 | 10 |
| (C1) (parts by weight) | 18 | 18 | 10 | 30 | — | — |
| (C2) (parts by weight) | — | — | — | — | 18 | — |
| (C3) (parts by weight) | — | — | — | — | — | 18 |
| (C4) (parts by weight) | — | — | — | — | — | — |
| (C5) (parts by weight) | — | — | — | — | — | — |
| (D) (parts by weight) | 12 | 12 | 12 | 12 | 12 | 12 |
| (E) (parts by weight) | 21 | 21 | 21 | 21 | 21 | 21 |
| (F) (parts by weight) | — | — | — | — | — | — |
| Light transmittance (%) | 0.13 | 0.11 | 0.18 | 0.08 | 0.21 | 0.24 |
| Notched Izod impact strength (kgf · cm/cm) | 3.1 | 10.2 | 7.9 | 3.9 | 7.4 | 7.3 |
| Coefficient of linear expansion (μ/m · °C.) | 32 | 47 | 48 | 31 | 39 | 39 |
| Flame retardancy | V-0 | V-2 | V-1 | V-1 | V-1 | V-1 |

TABLE 4

|  | Comparative Example | | | | | |
|---|---|---|---|---|---|---|
|  | 7 | 8 | 9 | 10 | 11 | 12 |
| (A) (parts by weight) | 100 | 100 | 100 | 100 | 100 | 100 |
| (B) (parts by weight) | 10 | 10 | 10 | 10 | 10 | 10 |
| (C1) (parts by weight) | — | — | 18 | 18 | 18 | 18 |
| (C2) (parts by weight) | — | — | — | — | — | — |
| (C3) (parts by weight) | — | — | — | — | — | — |
| (C4) (parts by weight) | 18 | — | — | — | — | — |
| (C5) (parts by weight) | — | 18 | — | — | — | — |
| (D) (parts by weight) | 12 | 12 | 1 | 25 | 12 | 12 |
| (E) (parts by weight) | 21 | 21 | 21 | 21 | 5 | 35 |
| (F) (parts by weight) | — | — | — | — | — | — |
| Light transmittance (%) | 0.11 | 0.19 | 0.17 | 0.08 | 0.12 | 0.14 |
| Notched Izod impact strength (kgf · cm/cm) | 5.2 | 7.7 | 8.6 | 4.7 | 7.8 | 4.5 |
| Coefficient of linear expansion (μm/m · °C.) | 36 | 43 | 52 | 30 | 37 | 40 |
| Flame retardancy | V-1 | V-1 | V-1 | V-1 | V-2 | V-0 |

From the results, it can be seen that the thermoplastic resin compositions according to the present disclosure exhibit good properties in terms of light shielding (light transmittance), impact resistance (notched Izod impact strength), dimensional stability (coefficient of linear expansion), flame retardancy, and balance therebetween.

Conversely, it can be seen that the composition of Comparative Example 1 prepared using an insufficient amount of the rubber-modified aromatic vinyl copolymer resin suffers from deterioration in impact resistance and the like, and the composition of Comparative Example 2 prepared using an excess of the rubber-modified aromatic vinyl copolymer resin suffers from deterioration in flame retardancy and the like. It can be seen that the composition of Comparative Example 3 prepared using an insufficient amount of talc suffers from deterioration in light shielding, and the like; the composition of Comparative Example 4 prepared using an excess of talc suffers from deterioration in impact resistance, and the like; the composition of Comparative Example 5 prepared using talc (C2) suffers from deterioration in light shielding, and the like; the composition of Comparative Example 6 prepared using talc (C3) suffers from deterioration in light shielding and the like; the composition of Comparative Example 7 prepared using talc (C4) suffers from deterioration in impact resistance and the like; and the composition of Comparative Example 8 prepared using talc (C5) suffers from deterioration in light shielding, and the like. It can be seen that the composition of Comparative Example 9 prepared using an insufficient amount of the acicular inorganic fillers suffers from deterioration in light shielding, dimensional stability, and the like, and the composition of Comparative Example 10 prepared using an excess of the acicular inorganic fillers suffers from deterioration in impact resistance and the like. Further, it can be seen that the composition of Comparative Example 11 prepared using an insufficient amount of the phosphorus flame retardant suffers from deterioration in flame retardancy and the like, and the composition of Comparative Example 12 prepared using an excess of the phosphorus flame retardant suffers from deterioration in impact resistance, and the like.

Exemplary embodiments have been disclosed herein, and although specific terms are employed, unless otherwise noted, they are to be interpreted in a generic and descriptive sense only and not for purpose of limitation. Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

It is within the scope of this disclosure for one or more of the terms "substantially," "about," "approximately," and/or the like, to qualify each adjective and adverb of the foregoing disclosure to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

For example, numerical values provided throughout this disclosure can be approximate, and for each range specified in this disclosure, all values within the range and all subranges within the range are also disclosed. Approximate values can be calculated, and it is believed that each value can vary by for example plus or minus about 10%, for example plus or minus about 5%, for example plus or minus 4%, for example plus or minus 3%, for example plus or minus 2%, for example plus or minus 1%, for example plus or minus less than 1%, for example plus or minus 0.5%, and as another example less than plus or minus 0.5%, including all values and subranges therebetween for each of the above ranges.

The use of the term "and/or" includes any and all combinations of one or more of the associated listed items.

As used herein, indefinite articles "a" and "an" refer to at least one ("a" and "an" can refer to singular and/or plural element(s)).

What is claimed is:

1. A molded article produced from a thermoplastic resin composition comprising:
    about 100 parts by weight of a polycarbonate resin;
    about 5 parts by weight to about 20 parts by weight of a rubber-modified aromatic vinyl copolymer resin;
    about 12 parts by weight to about 28 parts by weight of talc having an average particle size of about 8 μm to about 20 μm and a blackness degree L* of less than about 90;
    about 5 parts by weight to about 20 parts by weight of acicular inorganic fillers; and
    about 10 parts by weight to about 30 parts by weight of a phosphorus flame retardant,
    wherein the molded article is a plastic member of an electronic device housing, the electronic device housing comprising a metal frame and the plastic member, the plastic member adjoining at least one surface of the metal frame.

2. The molded article according to claim 1, wherein the rubber-modified aromatic vinyl copolymer resin comprises a rubber-modified vinyl graft copolymer.

3. The molded article according to claim 2, wherein the rubber-modified vinyl graft copolymer is prepared through graft copolymerization of a monomer mixture comprising an aromatic vinyl monomer and a monomer copolymerizable with the aromatic vinyl monomer to a rubber polymer.

4. The molded article according to claim 1, wherein the acicular inorganic fillers comprise wollastonite, glass fiber, carbon fiber, and/or basalt fiber.

5. The molded article according to claim 1, wherein the talc and the acicular inorganic fillers are present in a weight ratio (talc:acicular inorganic fillers) of about 1:0.2 to about 1:1.5.

6. The molded article according to claim 1, further comprising: about 5 parts by weight to about 15 parts by weight of a dye and/or a pigment relative to about 100 parts by weight of the polycarbonate resin.

7. The molded article according to claim 1, wherein the talc has an average particle size of about 12 μm to about 20 μm.

8. The molded article according to claim 7, wherein the talc has a blackness degree L* from about 80 to about 85.

9. The molded article according to claim 1, wherein the molded article has a light transmittance of about 0.16% or less, as measured on a 1 mm thick specimen in accordance with ASTM D1003.

10. The molded article according to claim 1, wherein the molded article has a notched Izod impact strength of about 5.5 kgf·cm/cm to about 20 kgf·cm/cm, as measured on a ⅛" specimen in accordance with ASTM D256.

11. The molded article according to claim 1, wherein the thermoplastic resin composition has a coefficient of linear expansion of about 30 μm/m·°C. to about 50 μm/m·°C., as measured on an injection-molded specimen having a size of 10 mm×10 mm×6.4 mm while raising a temperature from 0° C. to 60° C. at a rate of 5° C./min in accordance with ASTM D696.

12. The molded article according to claim 1, wherein the thermoplastic resin composition has a flame retardancy of V-1 or higher, as measured on a 1.0 mm thick injection molded-specimen by a UL-94 vertical test method.

\* \* \* \* \*